United States Patent

Thirumurthi et al.

(10) Patent No.: US 10,523,745 B2
(45) Date of Patent: Dec. 31, 2019

(54) LOAD BALANCING MOBILITY WITH AUTOMATED FABRIC ARCHITECTURE

(71) Applicant: CISCO TECHNOLOGY, INC., San Jose, CA (US)

(72) Inventors: Rajendra Kumar Thirumurthi, Milpitas, CA (US); Sachin Vijay Vishwarupe, Santa Clara, CA (US); Samar Sharma, San Jose, CA (US); Kushal A. Patel, San Jose, CA (US); Mouli Vytla, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 296 days.

(21) Appl. No.: 15/095,039

(22) Filed: Apr. 9, 2016

(65) Prior Publication Data

US 2016/0316005 A1    Oct. 27, 2016

Related U.S. Application Data

(60) Provisional application No. 62/152,027, filed on Apr. 23, 2015.

(51) Int. Cl.
*H04L 29/08*  (2006.01)
*H04L 12/803*  (2013.01)
*H04L 12/26*  (2006.01)
*H04L 12/947*  (2013.01)

(52) U.S. Cl.
CPC ........ *H04L 67/101* (2013.01); *H04L 67/1023* (2013.01); *H04L 43/0805* (2013.01); *H04L 47/125* (2013.01); *H04L 49/25* (2013.01)

(58) Field of Classification Search
CPC .......... H04L 29/12066; H04L 61/1511; H04L 29/12009; H04L 29/06; H04L 29/08072; H04L 47/10; H04L 47/30; H04L 11/0478; H04L 47/11; H04L 47/12
USPC ........................................................ 709/245
See application file for complete search history.

(56) References Cited

U.S. PATENT DOCUMENTS

| 8,601,084 B2 | 12/2013 | Carlander | |
|---|---|---|---|
| 2007/0258463 A1* | 11/2007 | Rhoades | H04L 63/1458 370/395.52 |
| 2011/0158088 A1* | 6/2011 | Lofstrand | G06F 9/465 370/229 |
| 2012/0207175 A1* | 8/2012 | Raman | H04L 47/125 370/412 |

(Continued)

OTHER PUBLICATIONS

PCT Sep. 18, 2016 International Search Report and Written Opinion from International Application Serial No. PCT/US2016/027126; 12 pages.

(Continued)

*Primary Examiner* — Mahran Y Abu Roumi

(57) ABSTRACT

In an example, there is disclosed a network apparatus, comprising: one or more logic elements, including at least one hardware logic element, to provide a network manager engine to: provide a switched fabric management function; communicatively couple to at least one network switch, the network switch configured to provide optional native hardware-based load balancing; monitor one or more load balancing factors; and at least partly responsive to the one or more load balancing factors, configure native hardware-based load balancing on the at least one network switch.

17 Claims, 9 Drawing Sheets

(56) References Cited

U.S. PATENT DOCUMENTS

| | | | | |
|---|---|---|---|---|
| 2012/0226801 A1* | 9/2012 | Velaga | ............... | H04L 67/1097 709/224 |
| 2013/0182708 A1* | 7/2013 | Sharma | ............... | H04L 12/4625 370/392 |
| 2013/0215754 A1* | 8/2013 | Tripathi | ............... | H04L 49/253 370/236 |
| 2013/0242983 A1* | 9/2013 | Tripathi | ............... | H04L 49/25 370/355 |
| 2013/0329730 A1* | 12/2013 | Zhang | ............... | H04L 12/4641 370/392 |
| 2014/0050091 A1* | 2/2014 | Biswas | ............... | H04L 45/64 370/235 |
| 2014/0092901 A1* | 4/2014 | Kapadia | ............... | H04L 45/745 370/390 |
| 2014/0207968 A1* | 7/2014 | Kumar | ............... | H04L 45/38 709/244 |
| 2016/0014048 A1* | 1/2016 | Tripathi | ............... | H04L 49/1507 370/359 |

OTHER PUBLICATIONS

European Examination Report in corresponding European Application No. 16718136.1, dated Apr. 18, 2019, 5 pages.

\* cited by examiner

ROUTING TABLE 400

| TRAFFIC BUCKET | NODE |
|---|---|
| B0 | N0 |
| B1 | N1 |
| B2 | N2 |
| B3 | N3 |
| B4 | N0 |
| B5 | N1 |
| B6 | N2 |
| B7 | N3 |

LOAD BALANCING MOBILITY WITH AUTOMATED FABRIC ARCHITECTURE

CROSS-REFERENCE TO RELATED APPLICATIONS

This application claims priority to U.S. Provisional Application 62/152,027, filed Apr. 23, 2015, titled "Instantiating Load Balancing Mobility with Automated Fabric Architecture," which is incorporated by reference in its entirety.

FIELD OF THE DISCLOSURE

This disclosure relates in general to the field of communications and, more particularly, to a method and apparatus for providing a system and method for load balancing mobility with an automated fabric architecture.

BACKGROUND

Data centers are increasingly used by enterprises for effective collaboration, data storage, and resource management. A typical data center network contains myriad network elements including servers, load balancers, routers, switches, etc. The network connecting the network elements provides secure user access to data center services and an infrastructure for deployment, interconnection, and aggregation of shared resources. Improving operational efficiency and optimizing utilization of resources in data centers are some of the challenges facing data center managers. Data center managers seek a resilient infrastructure that consistently supports diverse applications and services. A properly planned data center network provides application and data integrity and, further, optimizes application availability and performance.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other examples, the dimensions of the various features may be arbitrarily increased or reduced for clarity of discussion.

SUMMARY

Figure 1A:
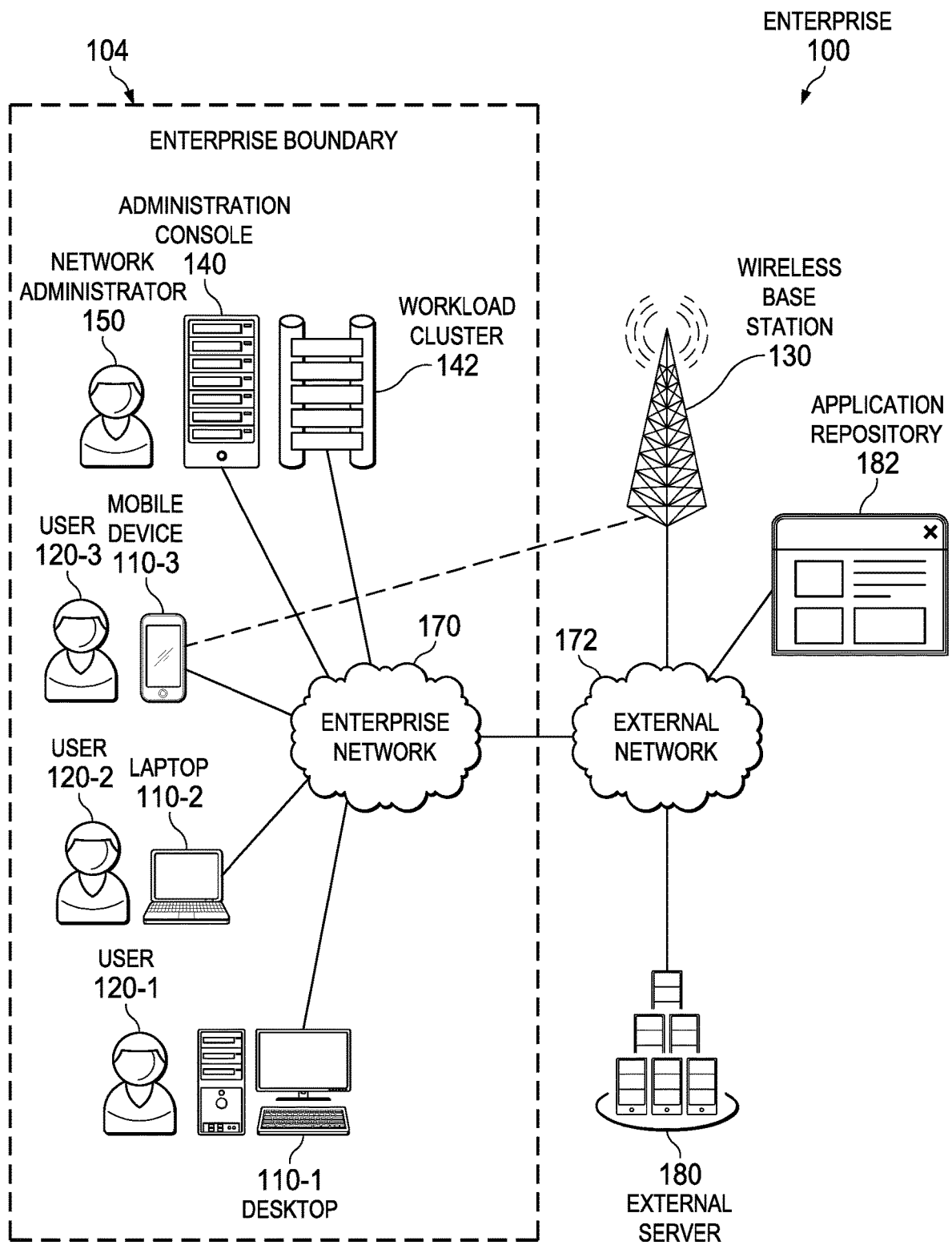
FIG. 1A is a network level diagram of an enterprise computing environment according to one or more examples of the present Specification.

In an example, there is disclosed a network apparatus, comprising: one or more logic elements, including at least one hardware logic element, to provide a network manager engine to: provide a switched fabric management function; communicatively couple to at least one network switch, the network switch configured to provide optional native hardware-based load balancing; monitor one or more load balancing factors; and at least partly responsive to the one or more load balancing factors, configure native hardware-based load balancing on the at least one network switch.

DETAILED DESCRIPTION OF THE EMBODIMENTS

The following disclosure provides many different embodiments, or examples, for implementing different features of the present disclosure.

In an example of a known computing system, a cluster of workload servers may be provisioned, either as physical servers or as virtual machines, to provide a desired feature to end-users or clients. To provide just one nonlimiting example, the workload servers may provide a website. When a plurality of users make a large number of simultaneous connections to the website, it is necessary to appropriately distribute the workload among the various servers in the server farm.

To this end, incoming traffic from client devices may be routed to a network switch. The network switch may then forward the traffic to a load balancer. An example of a commonly used load balancer is a network appliance or virtual appliance running a Linux operating system and provided with a full network stack, as well as load-balancing logic for determining to which server to send the traffic.

For example, a workload cluster may include 16 nodes, either physical servers or virtual machines. The load balancer itself may also be either a physical appliance or a virtual appliance. Upon receiving a packet, the load balancer determines the load on each of the 16 workload servers. The load balancer then applies an algorithm to determine an appropriate node for handling the traffic. This may include, for example, identifying a least burdened node and assigning the traffic to that node. Each node may have its own IP address, which in one embodiment is not exposed to end-user client devices. Rather, client devices are aware only of the IP address of the load balancer itself. Thus, the load balancer may modify the packet header, for example, by assigning it to the virtual IP (VIP) of one of the workload servers. The load balancer may then return the packet to the switch, which routes the packet to the appropriate workload server.

In this example, the incoming packet transfers from the switch to the load balancer, which may provide the full OSI 7 layer "stack" in software, operating on a full-featured operating system, such as Linux. Thus, the incoming packet is abstracted up to one of the upper layers of the OSI model, such as layer 6 or 7, so that it can be handled by the load-balancing software. The packet is then de-abstracted to a lower layer and returned to the switch, which forwards it to the appropriate workload server. Upon receiving the packet, the workload server again abstracts the packet up to one of the higher levels of the OSI model.

The inventors of the present Specification have recognized that the load balancer, and its overhead, represents a potential bottleneck that reduces the scalability of the network environment, and slows down handling of network traffic. The process of passing the packet up and down the OSI stack, in particular, while very fast from a human point of view, can be a significant bottleneck from the point of view of a network.

However, the named inventors of the present application have recognized that a network device, such as a switch or a router, can be configured to natively act as a load balancer in addition to performing its ordinary network switching function. In that case, rather than provide a load-balancing algorithm in an application running on an operating system, the switch may provide load-balancing via a much faster solution, such as programmable hardware rather than a general purpose software-driven processor. This means that the load-balancing logic is handled mostly or entirely at the hardware level. Furthermore, the switch generally operates at lower levels of the OSI model, such as layers 1 and 2. Thus, it has reduced overhead in abstracting and de-abstracting packets through the OSI stack.

Thus, the switch itself becomes the load balancer, and rather than acting as a bottleneck, is capable of providing terabit-class bandwidth by operating at the hardware level.

In an example, a concept of traffic buckets and nodes is described. Traffic may be divided into "buckets." Each bucket may be assigned to a node.

A traffic bucket serves as a classifier for identifying a subset of traffic to be redirected. As many traffic buckets can be created as needed for granularity. For bucketization of traffic, various L2/L3 header fields can be used in the algorithm.

By selecting different fields, many buckets can be created. By way of example, we can use B0, B1, B2, B3, B4 .... Bn to designate traffic buckets.

A traffic node serves as a "next-hop" for traffic forwarding. A node is an entity that has an associated IP address reachable from the switch. By way of example, we can use N0, N1, N2, N3 ... Nm to designate nodes.

Mapping can be established to associate a traffic bucket to a node. This association creates a packet path for forwarding of traffic for each bucket. This can include one-to-one mapping of a traffic bucket to a node, or many-to-one mapping of traffic buckets to a node (i.e., multiple nodes may be assigned to a single node).

This architecture realizes substantial advantages over certain existing deployments. For example, some existing load balancers suffer from shortcomings such as inefficiency and expense. In one example, a low capacity load-balancer provides approximately 40 Gbps, while a higher-end load balancer provides approximately 200 Gbps.

As discussed above, speed and scalability are enhanced by programming the load balancing engine in programmable hardware rather than in software running on a general-purpose processor programmed by software. Programmable hardware includes, for example, an application-specific integrated circuit (ASIC), field-programmable gate array (FPGA), programmable logic array (PLA), or similar.

Because the logic is implemented directly in hardware, it can execute a "program" orders of magnitude faster than a CPU, which must fetch instructions from memory, and then run those instructions on general-purpose hardware. Furthermore, an operating system, multitasking, and multi-layer network stack introduce additional complexity that does not contribute directly to carrying out the load balancing function. In short, a software-programmable CPU is extremely versatile, and its function may be easily adapted to many different tasks, but it is relatively slow. A dedicated programmable hardware device, programmed only for a single function, is not versatile, but carries out its single, dedicated function very quickly.

In one example, a hardware-based load balancer of the present Specification must be able to handle both traffic that is to be load balanced, and traffic that does not require load balancing. For non-load-balanced traffic, the device should still perform its native function as a switch or router, and simply switch or route the traffic as appropriate.

To aid in this, and to preserve the speed advantage of the programmable hardware-based load balancing engine, it is advantageous not to store data values in standard memories such as random access memories (RAM), as this could negate the speed advantages of the hardware. Rather, in one example, a ternary content-addressable memory (TCAM) is provided, and may be capable of operating at speeds approaching the speed of the programmable hardware itself. A content-addressable memory (CAM) is a species of memory used in extremely high-speed searches, such as those necessary for native terabit-class load balancing. CAM compares the search input (tag) to a table of stored data, and returns the address of matching datum. This is in contrast to RAM, in which the program provides an address, and the RAM returns a value stored at that address. When a search is performed, if the CAM finds a match for the tag, the CAM returns the address of the tag, and optionally, the value of the tag as well. If the tag is not found, a "not found" value is returned. TCAM is a species of CAM, in which a tag can be searched not only for a binary "1" or "0," but also for a ternary "X" (don't care). In other words, the search tag "110X" matches both "1101" and "1100."

In the context of load balancing, a network administrator may configure a virtual IP (VIP) tag, including in one example an IP address, protocol, and port number. Entries may be made in the TCAM for VIP tags that are to be load balanced. Entries may also be made for a set of nodes that can receive traffic matching that VIP tag.

The switch advertises the VIP tag via routing protocols, and receives traffic destined for VIP. When traffic enters the switch or router, the VIP tag is checked against entries in the TCAM. If there is a matching entry, the traffic is to be load balanced. The traffic is then bucketized and load balanced to each node using TCAM entries.

This architecture realizes several important advantages. As servers move from 1 Gbps to 10 Gbps, traditional software load balancers have to scale appropriately. Load balancer appliances and service modules also consume rack-space, power, wiring and cost. However, in an embodiment of the present Specification:

Every port of a switch or router can act as a load-balancer.

No external appliance and no service module are needed.

The teachings of this Specification can be used to provide terabit-class load balancing.

Resources may be distributed by a server load balancer to share workloads. A network administrator may divide responsibilities into various roles such as application, server, or network infrastructure, with different roles being served by different server pools. Within IT Organizations, these roles may actually be administered by different individual network administrators. Thus, coordination among internal groups is important. But such coordination may itself be time-consuming and may undermine at least some of the efficiency gains of virtualization. Thus, it is advantageous to streamline workload automation without manual intervention. To this end, the present Specification provides, inter alia, an intelligent traffic director (ITD) as a load balancing feature with host awareness provided, for example, by Cisco® Dynamic Fabric Automation (DFA) capabilities or other similar technology on a network switch. This enables "touchless" configuration of ITD as new nodes are added to or removed from a server pool.

According to embodiments of the present Specification, ITD may be integrated with DFA to provide additional automation, including automated provisioning of ITD load balancing. In this case, a switched fabric may be provided.

In some embodiments, balancing service policies may be defined as part of network definition and subsequently applied to a fabric with host machine ITD load balancing. The profile can be instantiated on various nodes depending on the several load balancing factors. These may include, by way of nonlimiting example:

a. The number of service connections per load balancer.
b. The number of services or virtual IPs (VIPs) per load balancer.
c. The number of nodes or servers per load balancer.
d. The number of connections per node or server.
e. The number of available ports per switch or line card.
f. Failure of a service node or switch.

Furthermore, scalability is greatly enhanced. Many network switches have the ability to modularly increase their size by adding on I/O modules. For example, a switch may have a baseline size of 48 ports, wherein each port can be connected to one physical server appliance. The physical server appliance may be a standalone appliance providing the workload service, or may be a server configured to provide a hypervisor and to launch instances of virtual machines on demand. If the 48 ports on the switch are exhausted, an additional I/O module, for example providing an additional 48 ports, may be added onto the switch. Thus, the switch can be scaled up to extremely large sizes with minimal configuration. The switch itself may be provided with a load-balancing engine, which in this case may include dedicated hardware, firmware, or very low-level software such as BIOS to provide the load-balancing logic.

Using these data, a network manager, such as a Cisco® Data Center Network Manager (DCNM) may dynamically provision ITD services. This may include collecting a list of VIPs for each hosted service (e.g., e-mail, HTTP, HTTPS, FTP), and also building an aggregate list of available switches, line cards, and ports in the fabric. The network manager may then monitor factors such as those listed above and dynamically provision ITD instances to meet the network demands. The network manager may also be configured to provision ITD instances appropriately, for example to ensure that a packet takes an optimal route through the fabric.

A system and method for providing load-balancing mobility with an automated fabric architecture will now be described with more particular reference to the attached FIGURES. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments many have different advantages, and no particular advantage is necessarily required of any embodiment.

In some embodiments, hyphenated reference numerals, such as 10-1 and 10-2, may be used to refer to multiple instances of the same or a similar item 10, or to different species of a genus 10.

FIG. 1A is a network-level diagram of a secured enterprise 100 according to one or more examples of the present Specification. In the example of FIG. 1, a plurality of users 120 operates a plurality of client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Client devices 110 may be any suitable computing devices. In various embodiments, a "computing device" may be or comprise, by way of non-limiting example, a computer, workstation, server, mainframe, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, virtual machine, virtual appliance, or any other electronic, microelectronic, or microelectromechanical device for processing and communicating data.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices. In this illustration, enterprise network 170 is shown as a single network for simplicity, but in some embodiments, enterprise network 170 may include a large number of networks, such as one or more enterprise intranets connected to the Internet. Enterprise network 170 may also provide access to an external network, such as the Internet, via external network 172. External network 172 may similarly be any suitable type of network.

A network administrator 150 may operate an administration console 140 to administer a workload cluster 142 and to otherwise configure and enforce enterprise computing and security policies.

Enterprise 100 may encounter a variety of "network objects" on the network. A network object may be any object that operates on or interacts with enterprise network 170. In one example, objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, for example, a word processing document with built-in macros or an animation with inline code. For security purposes, these may be considered as a separate class of software object, or may simply be treated as executable objects.

Enterprise security policies may include authentication policies, network usage policies, network resource quotas, antivirus policies, and restrictions on executable objects on client devices 110 by way of non-limiting example. Various network servers may provide substantive services such as routing, networking, enterprise data services, and enterprise applications.

Secure enterprise 100 may communicate across enterprise boundary 104 with external network 172. Enterprise boundary 104 may represent a physical, logical, or other boundary. External network 172 may include, for example, websites, servers, network protocols, and other network-based services. In one example, a wireless base station 130, an external server 180, and an application repository 182 may be provided on external network 172, by way of nonlimiting example. Wireless base station 130 may be, for example, an LTE base station or other similar device that connects to mobile device 110-3 wirelessly. Wireless base station 130 may in turn communicatively couple to external network 172. External server 180 may be a server that provides web pages, data, or other resources that enterprise users 120 may need to use.

Application repository 182 may represent a Windows or Apple "App Store" or update service, a Unix-like repository or ports collection, or other network service providing users 120 the ability to interactively or automatically download and install applications on client devices 110. In some cases, secured enterprise 100 may provide policy directives that restrict the types of applications that can be installed from application repository 182. Thus, application repository 182 may include software that is not malicious, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 120.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Figure 1B:
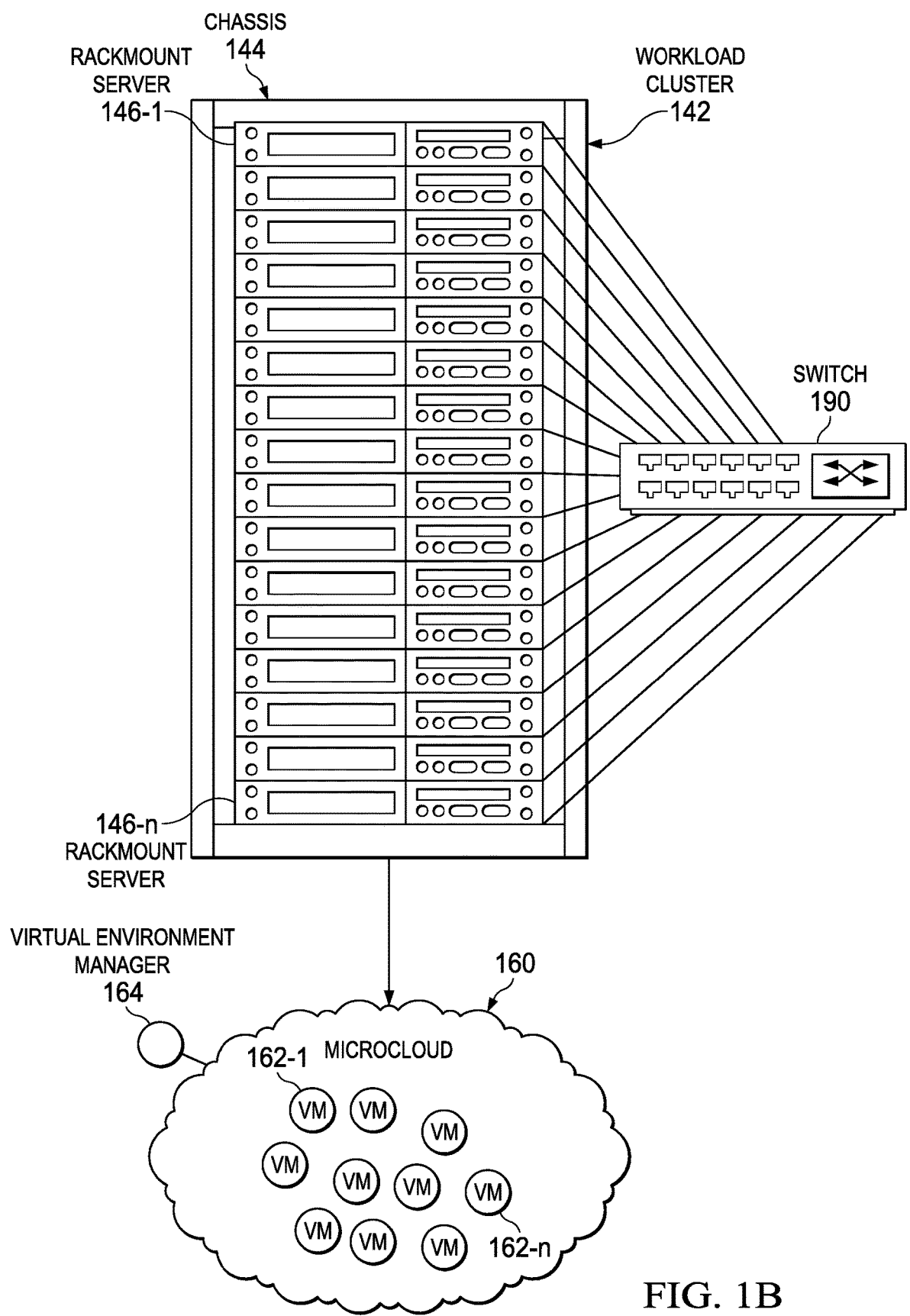
FIG. 1B is a more detailed view of a computing cluster according to one or more examples of the present Specification.

FIG. 1B is a block diagram disclosing a workload cluster 142 according to one or more examples of the present Specification. In this example, workload cluster 142 includes a rack mount chassis 144 which has installed therein a plurality of rack mount servers 146-1 through 146-N. Each rack mount server 146 may be a dedicated appliance, or may be configured with a hypervisor to launch one or more instances of a virtual client.

A switch 190 may be provided to communicatively couple workload cluster 142 to enterprise network 170. As described below, switch 190 may have a number of physical ports for communicatively coupling to rack mount servers 146. In an example, each server 146 has a physical wired connection, such as an Ethernet connection, to a single port of switch 190.

In some cases, some or all of rack mount servers 146-1 through 146-N are dedicated to providing a microcloud 160. Microcloud 160 may be a single purpose or dedicated cloud providing a particular service. For example, microcloud 160 may be configured to serve a website, provide communication systems such as one or more 4G LTE services, or any other appropriate service. In some cases, microcloud 160 is provided as a "tenant" on workload cluster 142. Workload cluster 142 may provide a virtual environment manager 164, which may be responsible for enforcing tenant boundaries between one or more microcloud tenants 160, and for dynamically provisioning virtual machines 162 as necessary. Virtual machines 162-1 through 162-N may represent a plurality of instances of a virtual server appliance. In some cases, VMs 162 may also be provided in different flavors. For example, some VMs 162 may be provisioned as firewalls, others may be provisioned as antivirus scanning appliance, and yet others may provide other auxiliary functions, in addition to VMs 162 provisioned as workload servers.

When switch 190 is provisioned with a load-balancing engine, the load-balancing engine is responsible for keeping track of the number and virtual IP (VIP) of workload servers, so that it can properly route traffic to the workload servers. In the case where each rack mount server 146 is a standalone appliance, switch 190 may maintain a table of the VIP of each rack mount server 146. In cases where workload servers are provided in a microcloud 160, switch 190 may provide a table that maps the VIP of each VM to a VIP assigned to the physical rack mount server 146 on which that VM 162 resides. Thus, switch 190 may include logic not only for routing the packet to the correct rack mount server 146, but also for directing the packet to the correct VM 162 on that rack mount server 146.

Figure 2A:
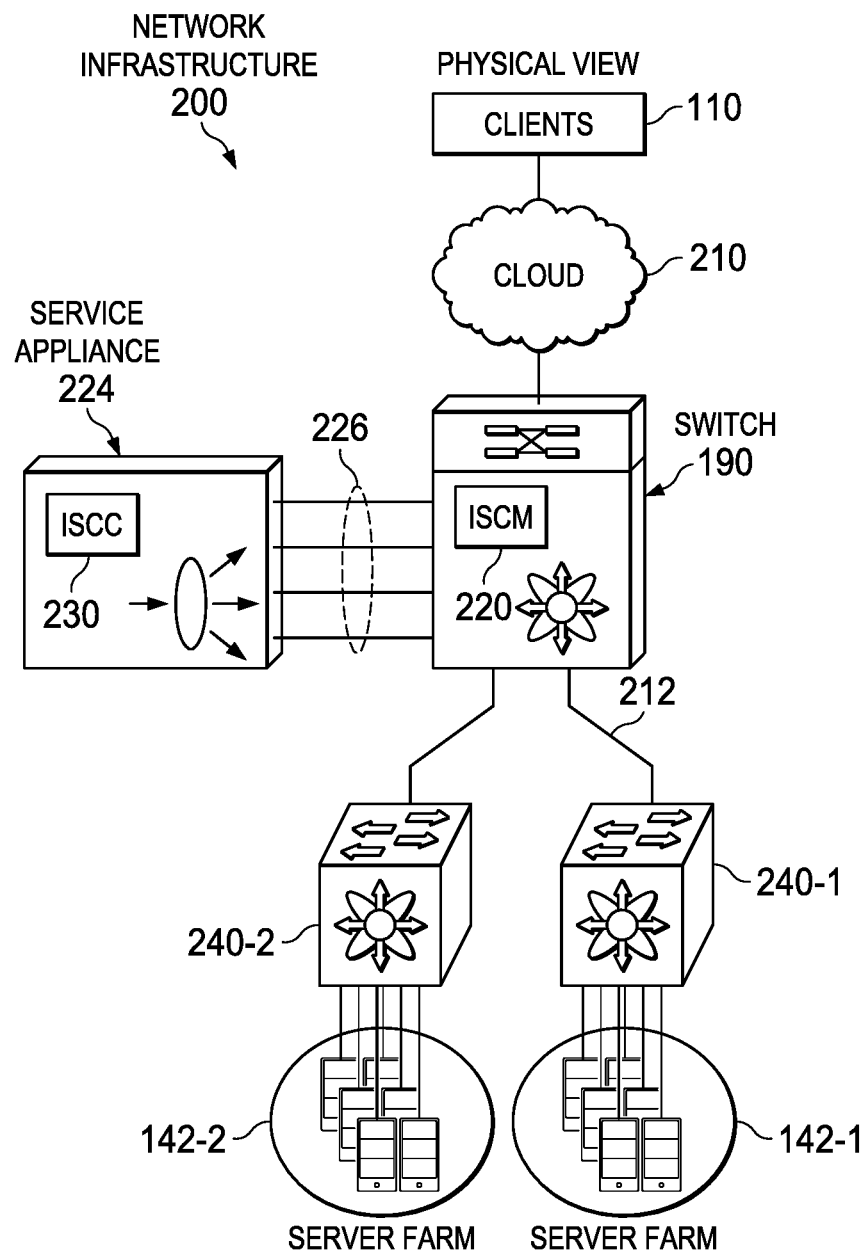
FIG. 2A is a is a simplified schematic diagram illustrating a physical view of a system for providing service appliances in a network environment according to one or more examples of the present Specification.
Figure 2B:
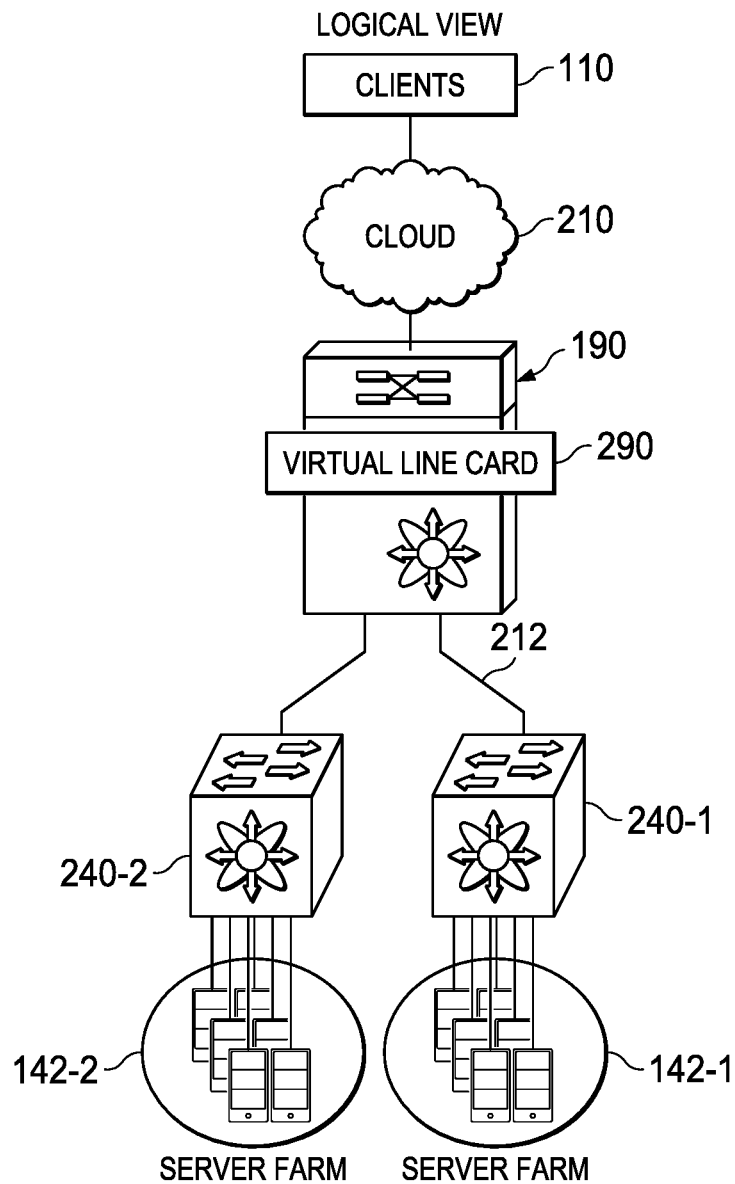
FIG. 2B is a simplified schematic diagram illustrating a logical view of the system according to one or more examples of the present Specification.

FIGS. 2A and 2B show examples of a system architecture for providing service appliances in a network environment, and specifically, providing service appliances as virtual line cards in a network switch. The virtual line card allows the service appliances to be located anywhere in the network, but other ways of providing the service appliance (e.g., directly connecting the service appliance on the switch) are also possible. It is noted that the examples are merely illustrative and are not intended to be limiting. Other architectures and configurations are envisioned by the disclosure.

FIG. 2A is a simplified schematic diagram illustrating a physical view of a system 110 for providing service appliances in a network environment. FIG. 2A includes a network (illustrated as multiple links 212) that connects one or more server farms 142-1 and 142-2 to one or more clients 110 via a cloud 210. Cloud 210 may encompass any public, semi-public, and/or private networks including enterprise networks, an Internet or intranet, community networks, etc. Individual servers in server farm 142-1 and 142-2 may communicate within the same farm via switches 240-1 and 240-2, respectively. Servers in server farm 142-1 may communicate with servers in server farm 142-2 via a switch 190 in this particular example implementation.

A service appliance 224 may connect to switch 190 over a communication channel 226 (e.g., over a port-channel). As used herein, a "communication channel" encompasses a physical transmission medium (e.g., a wire), or a logical connection (e.g., a radio channel, a network connection) used to convey information signals (e.g., data packets, control packets, etc.) from one or more senders (e.g., switch 190) to one or more receivers (e.g., service appliance 224). A communication channel, as used herein, can include one or more communication links, which may be physical (e.g., wire) or logical (e.g., data link, wireless link, etc.). Termination points of communication channels can include interfaces such as Ethernet ports, serial ports, etc. In embodiments of system 110, communication channel 226 may be a single channel: deployed for both control messages (i.e., messages that include control packets) and data messages (i.e., messages that include data packets).

As used herein, a "service appliance" is a discrete (and generally separate) hardware device or virtual machine with integrated software (e.g., firmware), designed to provide one or more network services including load balancing, firewall, intrusion prevention, virtual private network (VPN), proxy, etc. In some cases, switch 190 may be configured with an intelligent service card manager module (ISCM) 220, and service appliance 224 may be configured with a corresponding intelligent service card client module (ISCC) 230. ISCM 220 and ISCC 230 can form part of a Remote Integrated Service Engine (RISE) infrastructure for configuring service appliance 224 on the switch, e.g., as a virtual line card in switch 190.

FIG. 2B is a simplified schematic diagram illustrating a logical view of system 110. In some cases, ISCC 230 and ISCM 220 may be configured to allow service appliance 224 to appear as a virtual line card 290, or some other virtual network node/entity. The terms "line card" and "service module" are interchangeably used herein to refer to modular electronic circuits interfacing with telecommunication lines (such as copper wires or optical fibers) and that offer a pathway to the rest of a telecommunications network. Service appliance is often referred to simply as "appliance" or "module" herein. Hence, virtual line card 290 is interchangeable (in certain instances) with ISCM 220. A virtual service module (or a virtual line card) is a logical instance (of a service module) providing the same functionalities (as the service module). Service modules may perform various functions including providing network services (e.g., similar to service appliances). One difference between a service module and a service appliance is that the service module is physically located within a switch, for example, on an appropriate slot. Virtual service modules are similarly configurable within a switch.

In an example, RISE (or comparable technologies) allows (external) service appliances to connect to a switch and behave like a service module within a switch without having to take up a physical slot in the switch. RISE helps consolidate how the appliances are provisioned, and enables the appliances to have the benefits of being a service module within the switch. The task for provisioning and configuring of these service appliances is performed mostly by RISE being provided on the switch, making it easy for network administrators to add/remove service appliances in the network.

According to embodiments of the present disclosure, an appliance user can enjoy the same benefit of a service module's simple configuration and operation using the infrastructure of system 110. For example, setting up service appliance 224 for network configurations may be unnecessary. Substantially all such configurations may be made via switch 190, instead of service appliance 224. Service appliance 224 may offload (i.e., transfer) any network (e.g., L2/L3 network) specific control plane and data plane operations to switch 190. Data path acceleration that leverages an application specific integrated circuit (ASIC) (potentially embedded in switch 190) may also be possible in various embodiments. Switch 190 may communicate control messages to service appliance 224 over communication channel 226. Thus, configuration and provisioning of services within service appliance 224 may be implemented via switch 190.

Note that the numerical and letter designations assigned to the elements of FIGS. 2A and 2B do not connote any type of hierarchy; the designations are arbitrary and have been used for purposes of teaching only. Such designations should not be construed in any way to limit their capabilities, functionalities, or applications in the potential environments that may benefit from the features of system 110. For ease of description, only two representative server farms are illustrated in FIGS. 2A and 2B. Any number of server farms and switches may be connected in the network without departing from the broad scope of the present disclosure.

For purposes of illustrating the techniques of system 110, it is important to understand the communications in a given system such as the system shown in FIGS. 2A and 2B. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, network services such as load balancing, firewall, intrusion prevention, proxy, virtual private network (VPN), etc. are provided through one or more of the following options: (1) service appliances that connect to network switches and routers; (2) specially designed high-performance routers configured with the services; or (3) network devices such as routers or switches that are configured with service modules that provide the services.

Some service appliances (e.g., load balancers) integrate services such as load balancing, firewall, intrusion prevention, VPN, etc. in a single box format, which is generally based on modular, scalable platforms and which provides a cost-effective option of the three options listed previously. Service appliances may be connected externally to a switch (e.g., aggregate switch or access switch, etc.) via appropriate ports. Different service appliances are designed with specific features applicable to different network environments. The service appliances may be deployed independently to service-specific areas of the network infrastructure, or they may be combined for a layered approach. Service appliances are typically located between the clients and server farms. Data packets generally pass through the service appliances on the way to (and from) the servers/clients. The service appliances may be managed by a management application (e.g., software) on the service appliance that enables configuration settings and other management functions.

Specially designed high-performance routers may also provide network services. Such routers may implement a massive parallel processor hardware and software architecture to deliver integrated network services (e.g., firewall, deep packet inspection, etc.). Many of the functionalities are embedded in a specially designed processor in the router. For example, such a specially designed router can provide an integrated security solution (e.g., stateful packet filtering, intrusion detection and prevention, per-user authentication and authorization, VPN capability, extensive QoS mechanisms, multiprotocol routing, voice application support, and integrated WAN interface support) and routing in a single box.

Network services may also be integrated into a network device (such as a switch or router) using dedicated line cards. The line cards may be installed inside the device, allowing any port on the device to operate as a firewall port, while integrating the services inside the network infrastructure. Several line cards may be installed in the same chassis, providing a modular solution where needed. Such solutions permit the user to take advantage of existing switching and routing infrastructure without any costly upgrades.

Turning to the potential infrastructure of FIGS. 2A and 2B, the example network environment may be configured as one or more networks and, further, may be configured in any form including, but not limited to, local area networks (LANs), wireless local area networks (WLANs), virtual local area networks (VLANs), metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Elements of FIGS. 2A and 2B may be coupled to one another through one or more interfaces employing any suitable connection (wired or wireless), which provides a viable pathway for electronic communications. Additionally, any one or more of these elements may be combined or removed from the architecture based on particular configuration needs. System 110 may include a configuration capable of transmission control protocol/Internet protocol (TCP/IP) communications for the electronic transmission or reception of packets in a network. System 110 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various nodes in the network.

Switches in system 110, including switches 190, 240-1, and 240-2, may include any type of network element connecting network segments. For example, switches 190, 240-1, and 240-2 may include a multi-port network bridge that processes and routes data at a data link layer (Layer 2). In another example, switches 190, 240-1, and 240-2 may process data at a network layer (Layer 3), or Layer 4 (with network address translation and load distribution), or Layer 7 (load distribution based on application specific transactions), or at multiple layers (e.g., Layer 2 and Layer 3). In certain embodiments, functionalities of switches 190, 240-1, and 240-2 may be integrated into other network devices such as gateways, routers, or servers. In various embodiments, switches 190, 240-1, and 240-2 may be managed switches (e.g., managed using a command line interface (CLI), a web interface, etc.).

Communication channel 226 may include a port-channel, which can encompass an aggregation of multiple physical interfaces into one logical interface, for example, to provide higher aggregated bandwidth, load balancing and link redundancy. Communication channel 226 with multiple links can provide a high availability channel: if one link fails, traffic previously carried on this link can be switched to the remaining links. Communication channel 226 may contain up to 16 physical communication links and may span multiple modules for added high availability. In one embodiment, communication channel 226 can represent a port-channel with an aggregation of four point-to-point communication links over multiple ports. In another embodiment, communication channel 226 can represent a virtual port-channel (vPC).

Although FIGS. 2A and 2B show server farms 142-1 and 142-2, it should be appreciated that system 110 is not limited to servers. In fact, any network element may be connected to the network via appropriate switches, where these implementations may be based on particular needs. As used herein, the term "network element" is meant to encompass computers, virtual machines, network appliances, servers, routers, switches, gateways, bridges, load balancers, firewalls, processors, modules, or any other suitable device, component, proprietary element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, server farms 142-1 and 142-2 may be replaced with LANs connecting desktop computers in a small office. In another example, server farms 142-1 and 142-2 may be replaced with a network of wireless communication devices. In yet another example, server farms 142-1 and 142-2 may be replaced with one or more supercomputers. Various other configurations and devices are contemplated within the broad framework of the present disclosure.

According to embodiments of the present disclosure, system 110 may provide for a fabric extender (FEX)-like protocol, auto-discovery, message transport service (MTS)-like control messages, and defined messages between service appliance 224 and switch 190. Configuration of service appliance 224 may be performed on switch 190 as for a line card. Data path forwarding may be offloaded to network line cards in switch 190. Control path processing may be offloaded to a supervisor engine on switch 190 as appropriate. In embodiments where service appliance 224 has multiple virtual services (e.g., virtual machines), each virtual service may be a separate virtual line card on switch 190.

Figure 3:
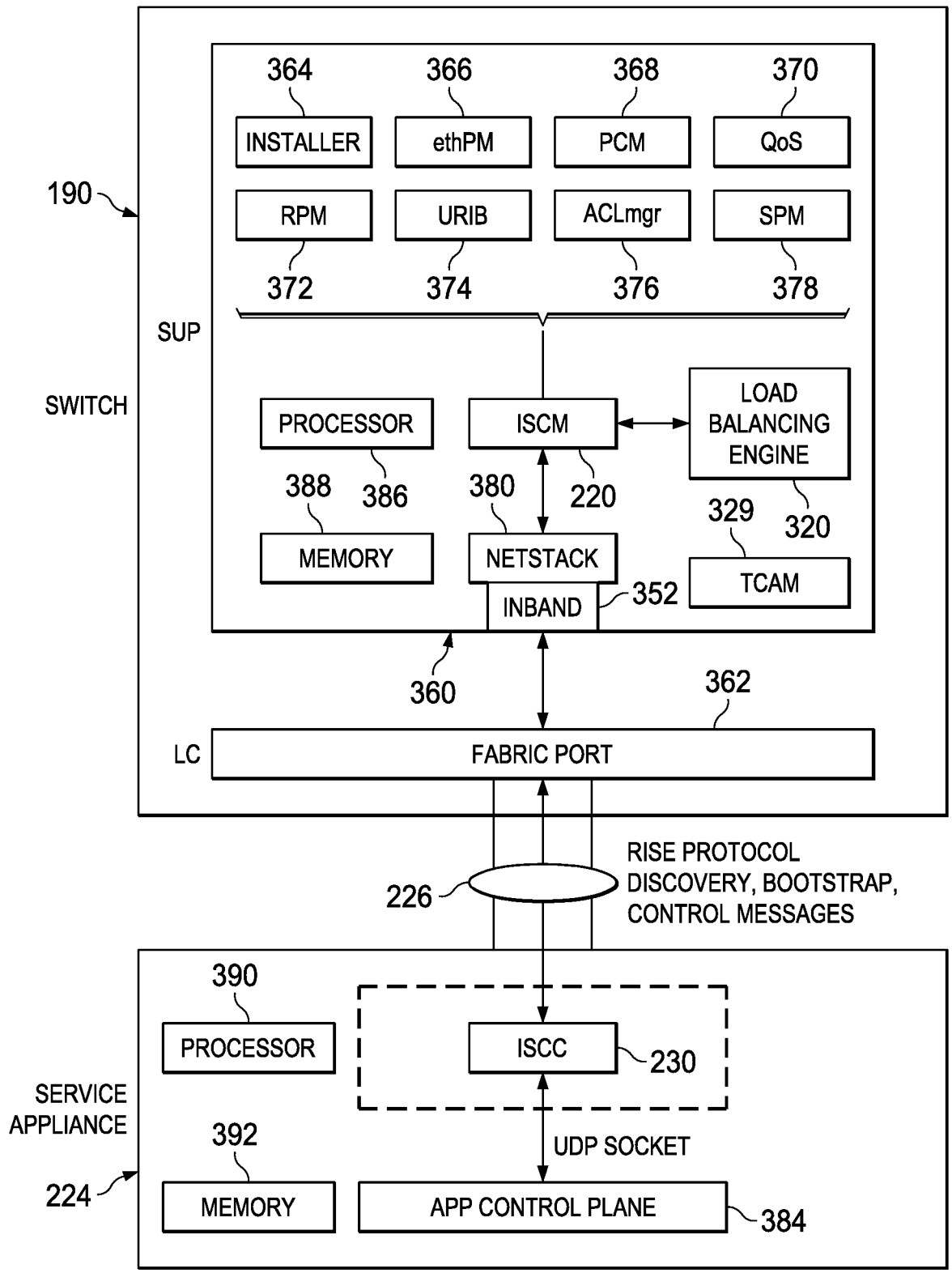
FIG. 3 is a block diagram of a network switch according to one or more examples of the present Specification.

FIG. 3 is a simplified block diagram illustrating example details of system 110 according to embodiments of the present disclosure. A supervisor engine 360 on switch 190 may communicate with service appliance 224 via a line card including a fabric port 362 that connects point-to-point to a node on service appliance 224. Supervisor engine 360 may include several modules such as an installer 364, an Ethernet port manager (ethPM) 366, a port-channel manager (PCM) 368, a Quality of Service (QoS) element 370, a route policy manager (RPM) 372, a unified/unicast routing information base (URIB) 374, an access control list manager (ACLmgr) 376, and a service policy manager (SPM) 378 for performing various routing and/or management functions. ISCM 220 may be provisioned in supervisor engine 360 to provide RISE related functionalities. ISCM 220 may manage one or more service modules, including in-chassis service modules and remote service modules.

In various embodiments, service appliance 224 may support stream control transmission protocol (SCTP) with various addresses (e.g., 127 addresses). In the absence of native SCTP support in supervisor engine 360, tunneling over UDP may be enforced to send SCTP packets. A Netstack module 380 may be provisioned in supervisor engine 360 for implementing TCP/IP stack for received frames hitting the control-plane of supervisor engine 360. Supervisor engine 360 may be configured with an inband port 352, which may be a virtual port that provides an interface for management traffic (such as auto-discovery) to a management processor such as a processor 386.

Each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In various examples, a "processor" may include any combination of logic elements, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 386 may be treated as only one core of a multi-core processor, or may be treated as the entire multi-core processor, as appropriate. In some embodiments, one or more co-processors may also be provided for specialized or support functions. In some examples, the processor is a programmable hardware device, which in this Specification expressly excludes a general-purpose CPU.

Load balancing engine 320, in one example, is operable to carry out computer-implemented methods as described in this Specification. Load balancing engine 320 may include one or more processors, and one or more non-transitory computer-readable mediums having stored thereon executable instructions operable to instruct a processor to provide load balancing. As used throughout this Specification, an "engine" includes any combination of one or more logic elements, of similar or dissimilar species, operable for and configured to perform one or more methods provided by load balancing engine 320. Thus, load balancing engine 320 may comprise one or more logic elements configured to provide methods as disclosed in this Specification. In some cases, load balancing engine 320 may include a special integrated circuit designed to carry out a method or a part thereof, and may also include software instructions operable to instruct a processor to perform the method. In some cases, load balancing engine 320 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that load balancing engine 320 may also include other hardware and software, including configuration files, registry entries, and interactive or user-mode software by way of non-limiting example.

In one example, load balancing engine 320 includes executable instructions stored on a non-transitory medium operable to perform a method according to this Specification. At an appropriate time, such as upon booting the device or upon a command from the operating system or a user, the processor may retrieve a copy of software from storage and load it into memory. The processor may then iteratively execute the instructions of load balancing engine 320 to provide the desired method.

In another example, load balancing engine 320 includes logic executed on an ASIC, FPGA, or other low-level hardware device specifically programmed to carry out the functions of load balancing engine 320. In one case, any portions of load balancing engine 320 that are not hard-coded into the logic may be loaded from a firmware or similar memory. In this case, load-balancing engine 320 may operate without the benefit of an operating system, to improve speed and efficiency.

Load balancing engine 320 may also communicatively couple to a TCAM 329. TCAM 329 may be configured to provide high-speed searching as disclosed herein.

According to various embodiments, ISCM 220 may offer various functionalities such as handling (i.e., accommodating, managing, processing, etc.) RISE messages (e.g., in MTS format), high availability activities, timer events, packet switch stream (PSS), American Standard Code for Information Interchange (ASCII) generation, logging, event handling, health monitoring, debugging, etc. ISCM 220 may be a finite state machine utility (FSMU) based application (e.g., which indicates an abstract machine that can be in one of a finite number of states). In various embodiments, ISCM 220 may have a well-defined MTS seamless authentication protocol (MTS SAP) assigned and it can open a socket-based MTS queue and bind to the well-defined SAP such that other processes may communicate with it.

In various embodiments, ISCM 220 may also maintain an array of MTS operation code ("opcode"), which can define how to process a received MTS message. The array may include per-opcode specific MTS flags, handler functions, etc. ISCM 220 may be configured to receive CLI driven MTS messages, MTS notifications (such as event driven messages indicating, for example, that a particular VLAN is up or down), and MTS request/responses. In various embodiments, ISCM 220 may be configured so that MTS-based communication with other processes may be non-blocking and asynchronous. Thus, ISCM 220 may handle multiple events (which can arrive at any time) for the same resource such that the state of the resource is consistent (and not compromised). A similar opcode can be provided even in non-MTS messages, which serves to indicate how a switch or a service can process the message.

After ports (e.g., appliance ports and switch ports) have been configured in RISE mode, ISCM 220 and ISCC 230 may perform auto-discovery and bootstrap to establish an appropriate control channel. After the control channel is established, applications in service appliance 224 may send control messages (e.g., using the UDP socket interface) to ISCC 230 through an application control plane 384. Application control plane 384 generally encompasses one or more software components for performing workflow management, self-management, and other application control layer processes. ISCC 230 may forward the control messages to ISCM 220 of switch 190 over communication channel 226. In example embodiments, ISCM 220 and ISCC 230 may communicate via UDP packets; however, various other protocols and formats may be accommodated by the teachings of the present disclosure. Supervisor 360 may be provisioned with (or have access to) processor 386 and a memory 388 for performing its various functions. ISCM 220 may use processor 386 and memory 388 to perform RISE related functions in switch 190. Similarly, service appliance 224 may be provisioned with (or have access to) a processor 390 and a memory 392. ISCC 230 may use processor 390 and memory 392 to perform RISE related functions in service appliance 224.

Figures 4, 5:
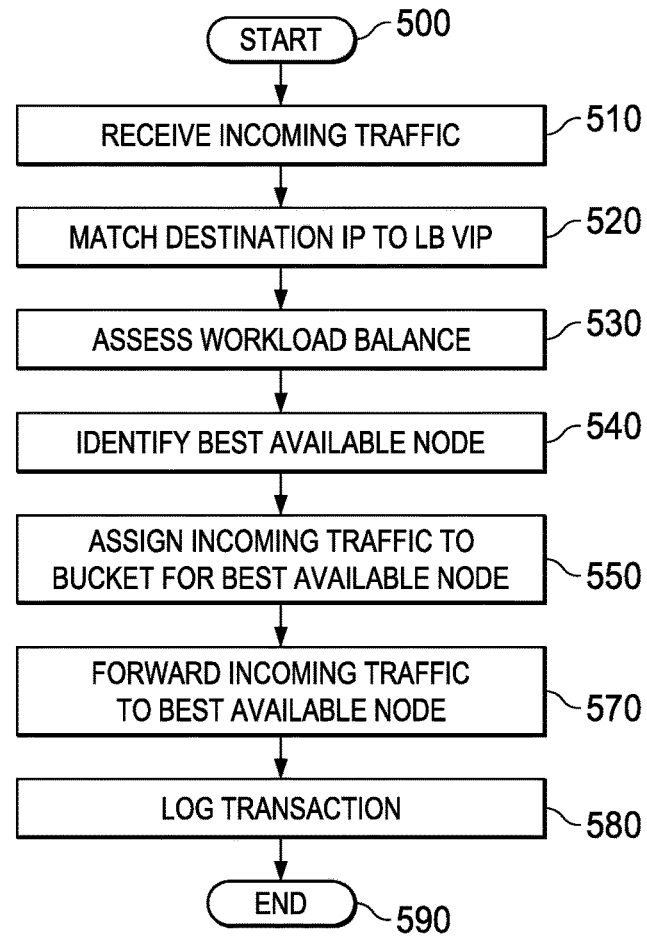
FIG. 4 is a block diagram of a routing table according to one or more examples of the present Specification.
FIG. 5 is a flow chart of a method performed by a switch according to one or more examples of the present Specification.

FIG. 4 is a block diagram of a routing table 400 according to one or more examples of the present Specification. In this example, four nodes are provided, designated node N0, N1, N2, and N3. Each node represents a server appliance having a unique VIP, whether a dedicated hardware server appliance or a virtual server appliance.

Load-balancing engine 320 designates 8 traffic buckets, labeled B0, B1, B2, B3, B4, B5, B6, and B7. Based on load and demand, load-balancing engine 320 maps each traffic bucket to an appropriate node. In this example, buckets B0 and B4 are mapped to node N0. Buckets B1 and B5 are mapped to node N1. Buckets B2 and B6 are mapped to node N2. Buckets B3 and B7 are mapped to node N3. These mappings are provided by way of nonlimiting example only, and are provided strictly to illustrate the principle of mapping buckets to nodes.

When switch 190 receives incoming traffic, load-balancing engine 320 operates to execute an appropriate algorithm for assigning the incoming traffic to a traffic bucket. This may include, for example, random or pseudorandom assignment, round robin scheduling, or any suitable scheduling algorithm. In one example, an algorithm may be based on the source IP address of the incoming packet, as described in more detail in connection with FIGS. 7 and 8.

After assigning the traffic to a bucket, switch 194 modifies the packet with the appropriate VIP for the node servicing that bucket, and forwards the packet.

When a response comes, switch 194 modifies the packet to reflect the publically visible IP address of switch 194, so that the load balancing is completely invisible to external hosts.

FIG. 5 is a flowchart of an example method 500 performed by load-balancing engine 320 according to one or more examples of the present Specification.

In block 510, switch 190 receives incoming traffic and provides the incoming traffic to load-balancing engine 320.

In block 520, switch 190 compares the destination IP of the incoming traffic to the VIP designated for load balancing. If there is a match, the incoming traffic is provided to load balancing engine 320 for load balancing. If not, then switch 190 simply routes or switches the traffic according to its normal function.

In block 530, load-balancing engine 320 assesses workload balance for available workload servers. As described above, this may be performed via round-robin assignment, random or pseudo-random assignment, or any other suitable load balancing algorithm.

In block 540, load-balancing engine 320 identifies the best available node for servicing the incoming traffic, based on the assessing of block 530.

In block 550, according to the identifying of block 540, load-balancing engine 320 assigns the incoming traffic to a bucket associated with the best available node. Assigning to a node may comprise modifying the header to reflect the VIP for the assigned node.

In block 570, after load-balancing engine 320 has assigned the traffic to an appropriate bucket and thereby to an appropriate node, switch 190 forwards the incoming traffic to the node designated for servicing that bucket, specifically by forwarding the traffic to the appropriate VIP.

In block 580, load-balancing engine 320 may log the transaction, as appropriate or necessary.

In block 590, the method is done.

Figure 6:
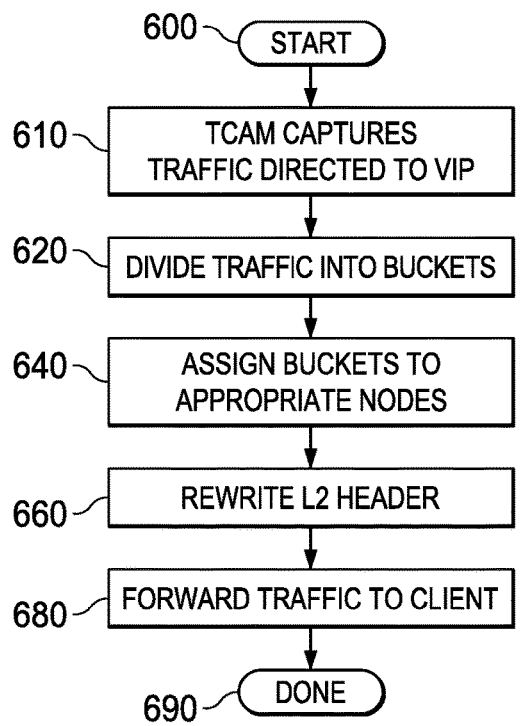
FIG. 6 is a flow chart of a method of load balancing according to one or more examples of the present Specification.

FIG. 6 illustrates a method of performing load balancing on a switch with the aid of a TCAM, such as TCAM 329 according to one or more examples of the present Specification. This example employs the notion of a flow. In an example, a flow is uniquely identified by a tuple T, comprising src-ip (source IP address), dst-ip (destination IP address), protocol, L4-src-port (layer 4 source port) and L4-dst-port (layer 4 destination port).

In an example, a client device 110-1 sends a packet directed to a VIP serviced by switch 190. By way of illustration, this flow is referred to as F1, and tuple T1 identifies flow F1. Tuple T1 comprises (Dev-110-1-IP, VIP, TCP, L4-src-port, L4-dest-port).

Similarly client device 110-2 initiates traffic to the same VIP. Since client 110-2's IP address is different from client 110-1's, this flow will have a different Tuple. By way of illustration, this is referred to as flow F2, identified by tuple T2. Tuple T2 comprises (Dev-110-2-IP, VIP, TCP, L4-src-port, L4-dest-port).

In various examples, sets of buckets may be part of a "pool," and one or more pools can be assigned to a single VIP, allowing VIP traffic to be load balanced among server nodes.

Referring now to method 600 in FIG. 6, it is assumed that switch 190 has now received flows F1 and F2.

In block 610, TCAM 329 looks up the IP address of VIP as it appears in both flows. In this example, both flows are directed to the VIP, which is a virtual IP address for a service provided by servers in workload cluster 142. Thus, switch 190 can quickly determine that flows F1 and F2 are to be load balanced.

In block 620, load balancing engine 320 assigns each node to a traffic bucket as described herein. In certain examples, this may be accomplished by any of the load balancing algorithms disclosed herein, or by any other appropriate load balancing algorithm. In one example, assigning each flow to a bucket comprises assigning according to method 900 of FIG. 9, based on Dev-110-1-IP and Dev-110-2-IP respectively. In that case, TCAM 329 may include a table mapping masked IP address fragments to traffic buckets.

In block 640, load balancing engine 320 assigns each flow to a node for servicing, such as a workload server in workload cluster 142. This may be a deterministic assignment based on the traffic bucket that each flow was assigned to. For increased speed, this may also be performed using TCAM 329. For example, TCAM 329 may include a table mapping traffic buckets to service nodes.

In block 660, load balancing engine 320 rewrites the L2 header for the incoming packets. For example, assuming that flow F1 was assigned to service node 1 in workload cluster 142, and flow F2 was assigned to service node 2 in workload cluster 142, load balancing engine 320 rewrites the L2 headers for the packets in those flows to direct them to their respective service nodes.

In block 680, switch 190 is finished with its load balancing tasks, and now acts as a switch, switching or routing the packets to the nodes provided by their new L2 headers.

Blocks 610 through 680 are repeated for each incoming packet, with an appropriate bucket and service node being selected for each. Assuming a well-configured load balancing engine 320, packets will be well distributed across available service nodes in workload cluster 142 so that workload is optimally distributed across available service nodes.

Reverse traffic (response from service nodes to client devices) are delivered directly to the respective clients without any intervention from load balancing engine 320.

In Block 690 the method is done.

Figure 7:
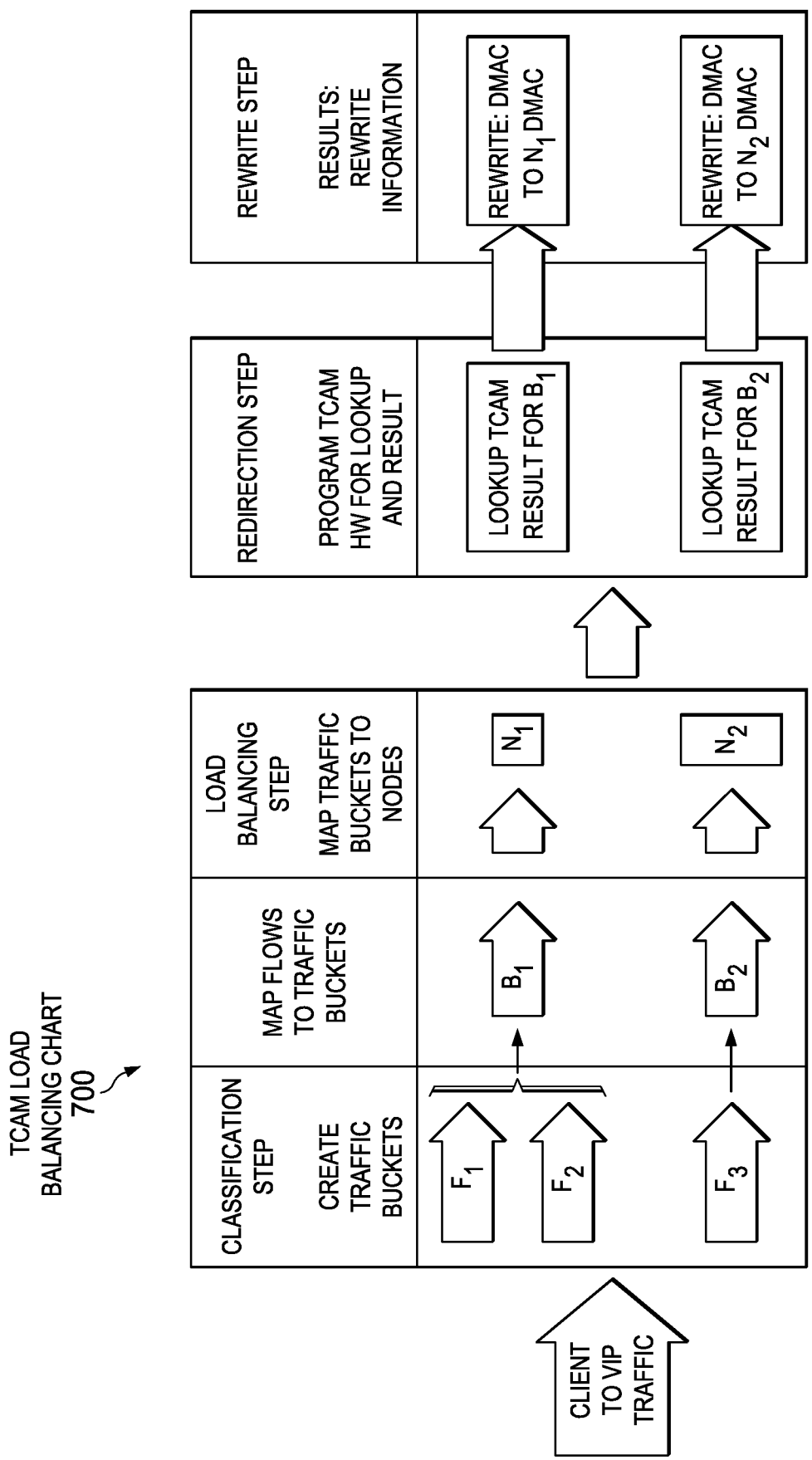
FIG. 7 is a block diagram of a method according to one or more examples of the present Specification.

FIG. 7 is a block diagram view 700 of method 600 as described in FIG. 6.

Figure 8:
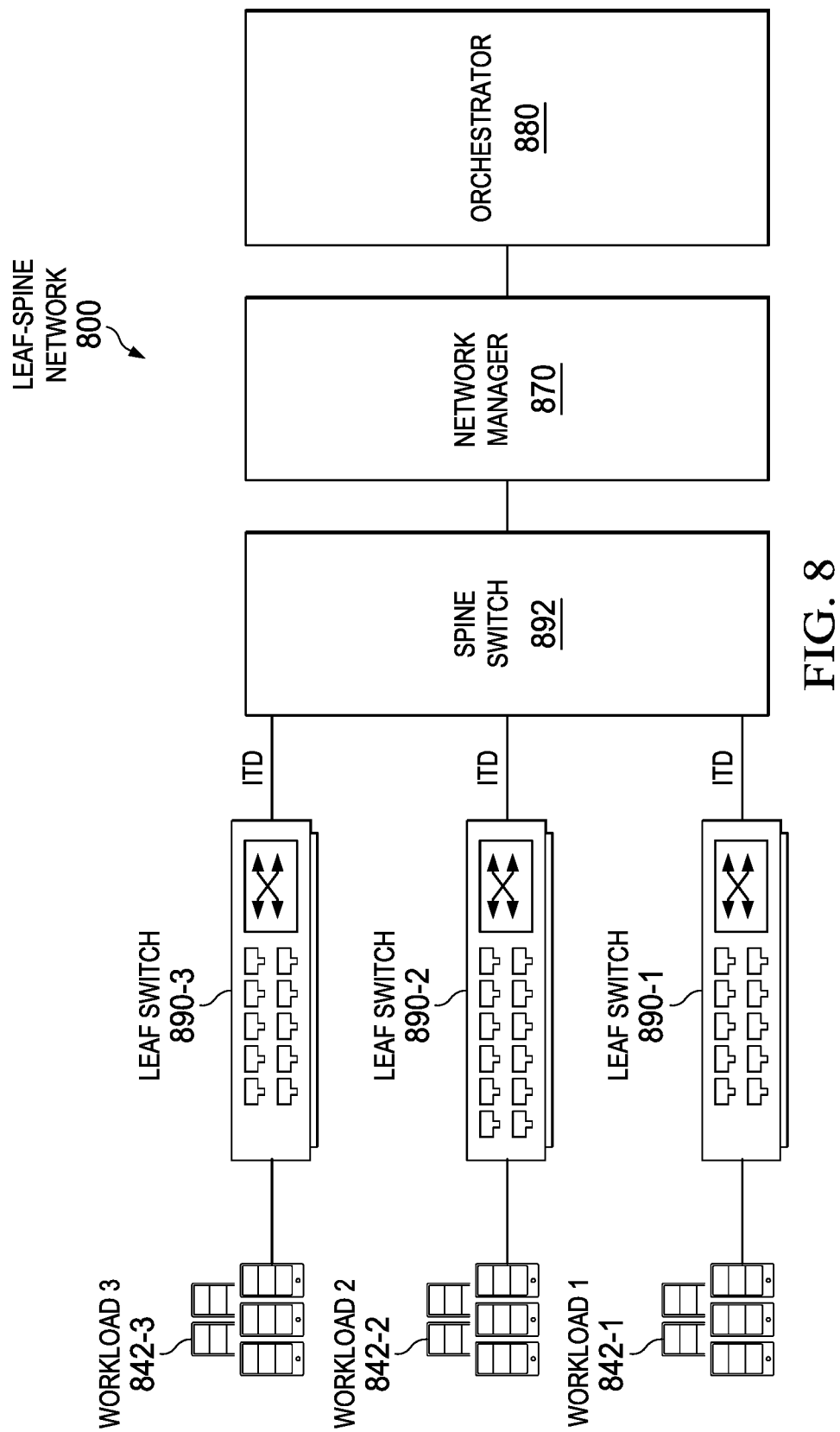
FIG. 8 is a block diagram of a TCAM table according to one or more examples of the present Specification.

FIG. 8 is an illustration of a leaf-spine network 800 according to one or more examples of the present Specification. In contrast to the three-layer "tree" architecture, leaf-spine has only two layers: a leaf layer and a spine layer. To illustrate the principle, one spine switch 892 and three leaf switches 890 are shown in this FIGURE. In a deployed network, the number of spine switches 892 and leaf switches 890 will be determined by the configuration and demands of the network.

All devices in leaf-spine network 800 are the same number of segments away, and have a consistent latency. The leaf layer of leaf-spine network 800 may include leaf switches 890 that connect to terminal devices such as servers, or intermediate devices such as edge routers, firewalls, security devices, or any other suitable device. The spine layer, including one or more spine switches 892, interconnects each leaf switch 890 with each other leaf switch 890, and also connects leaf switches 890 to other spine switches 892. While generally applicable as a routing topology, leaf-spine is especially useful in data centers, where there is a focus on data traveling between nodes in a single network (rather than, for example, data traveling outside of the network). Specific embodiments of leaf-spine include "Transparent Interconnection of Lots of Links" (TRILL) or "shortest path bridging" (SPB). Both Trill and SPB may determine where they are connected to the fabric so as to provide a loop-free, shortest path to their respective Ethernet MAC addresses In an example of a leaf-spine architecture, three-layer routing may be used to interconnect the layers. This may enable the predictable latency discussed above. Dynamic routing may also be used to determine the best path between nodes. In certain embodiments, routes may be adjusted based on changes in the network. In an embodiment, routes may be configured via "Equal-Cost Multipathing" (ECMP). Advantageously, with ECMP, a plurality of connections can remain active, and network loops can be avoided.

Certain embodiments of leaf-spine may also make it easier to add, upgrade, replace, or otherwise reconfigure hardware with minimal network disruptions. In an example, an additional spine switch can easily be added to the network, and then necessary uplinks can be added to each leaf switch. This seamlessly provides additional interlayer bandwidth. Similarly, when additional port capacity is needed, additional leaf switches 890 can be added. These are communicatively coupled to every spine in the network. For example, leaf-spine network may provide a fabric such as Cisco® Standalone Fabric.

In the example of FIG. 8, a network manager 870 and orchestrator 880 are also provided. Network manager 870 may be any suitable device, such as a Cisco® Prime Data Center Network Manager (DCNM) or similar. Orchestrator 880 may be a suitable network orchestrator, such as Cisco® Unified Computing System Director (UCSD), VMWare vCD, or OpenStack, by way of nonlimiting example.

Leaf switches 890 each connect to one or more workloads 842. Workloads 842 may be individual workload servers, workload clusters, rack-mount virtual machine tenants, or any other suitable architecture. Specifically, workload 1 842-1 communicatively couples to the network via leaf switch 1 890-1. Workload 2 842-2 communicatively couples to the network via leaf switch 2 890-2. Workload 3 842-3 communicatively couples to the network via leaf switch 3 890-3.

Spine switches 892 and leaf switches 890 may each be an example of a switch 190 as disclosed in FIGS. 1-3. In one embodiment, leaf switches 890 are configured with ITD capabilities as described herein. However, ITD need not be enabled in all cases. Rather, to conserve resources, it may be beneficial to enable ITD only on those leaf switches 890 where it is needed to handle the load. Thus, network manager 870 may be responsible for overseeing leaf-spine network 800, determining how many ITD instances are needed and where they are needed.

In an example, each workload 842 may be associated with a particular service served by a particular VIP. For example, one workload may be HTTPS, one may be sFTP, and one may be an e-mail server, each with its own VIP. As discussed above, a single instance of ITD may be capable of effectively handling multiple workloads associated with multiple VIPs. However, as the number of nodes in a particular workload 842 increases, the efficiency of ITD may deteriorate, in which case ITD itself could become a bottleneck. In that case, it may be beneficial to provision ITD on yet another leaf switch 890 to take over additional load.

Network manager 870 is well suited to the task of managing when and where to provision ITD instances, as it has a comprehensive view of the entire network. In some embodiments, balancing service policies may be defined as part of network definition and subsequently applied to a fabric with host machine ITD load balancing. The profile can be instantiated on various nodes depending on the several load balancing factors. These may include, by way of nonlimiting example:

a. The number of service connections per load balancer.
b. The number of services or virtual IPs (VIPs) per load balancer.
c. The number of nodes or servers per load balancer.
d. The number of connections per node or server.
e. The number of available ports per switch or line card.
f. Failure of a service node or switch.

Furthermore, scalability is greatly enhanced. Many network switches have the ability to modularly increase their size by adding on I/O modules. For example, a switch may have a baseline size of 48 ports, wherein each port can be connected to one physical server appliance. The physical server appliance may be a standalone appliance providing the workload service, or may be a server configured to provide a hypervisor and to launch instances of virtual machines on demand. If the 48 ports on the switch are exhausted, an additional I/O module, for example providing an additional 48 ports, may be added onto the switch. Thus, the switch can be scaled up to extremely large sizes with minimal configuration. The switch itself may be provided with an ITD load balancing engine.

Using these data, network manager 870 may dynamically provision ITD services. This may include collecting a list of VIPs for each hosted service (e.g., e-mail, HTTP, HTTPS, FTP), and also building an aggregate list of available switches, line cards, and ports in the fabric. The network manager may then monitor factors such as those listed above and dynamically provision ITD instances to meet the network demands. The network manager may also be designed to configure ITD instances appropriately, for example to ensure that a packet takes an optimal route through the fabric.

Figure 9:
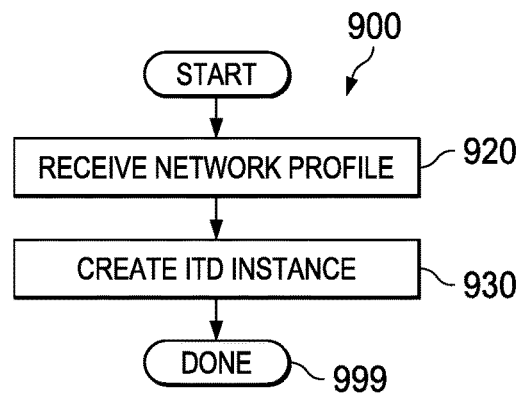
FIG. 9 is a block diagram of a method according to one or more examples of the present Specification.

FIG. 9 is a flow chart of a method 900 performed by a switch 190 according to one or more examples of the present Specification. Switch 190 may be, for example, a leaf switch 890 of FIG. 8, and may be controlled by a network manager 870.

Switch 190 may be configured with ITD capabilities, but the ITD function is configurable by network manager 870. Thus, if ITD is disabled on switch 190, then switch 190 performs only its ordinary switching function. Upon a signal or instruction from network manager 870, switch 190 may enable its ITD function, including receiving a load balancing network profile from network manager 870, such as one or more VIPs to load balance to, load balancing options, traffic "buckets" to use, and any other suitable options.

In block 920, switch 190 (such as a leaf switch 890 of FIG. 8) receives a network profile from network manager 870, along with instructions to provision a new ITD instance on that switch 190.

In block 930, switch 190 creates the new ITD instance according to the network profile received from network manager 870, and begins performing load balancing. Optionally, switch 190 may provide a status report to network manager 870, such as a success or failure report, including any error codes as appropriate.

In block 999, the method is done.

Figure 10:
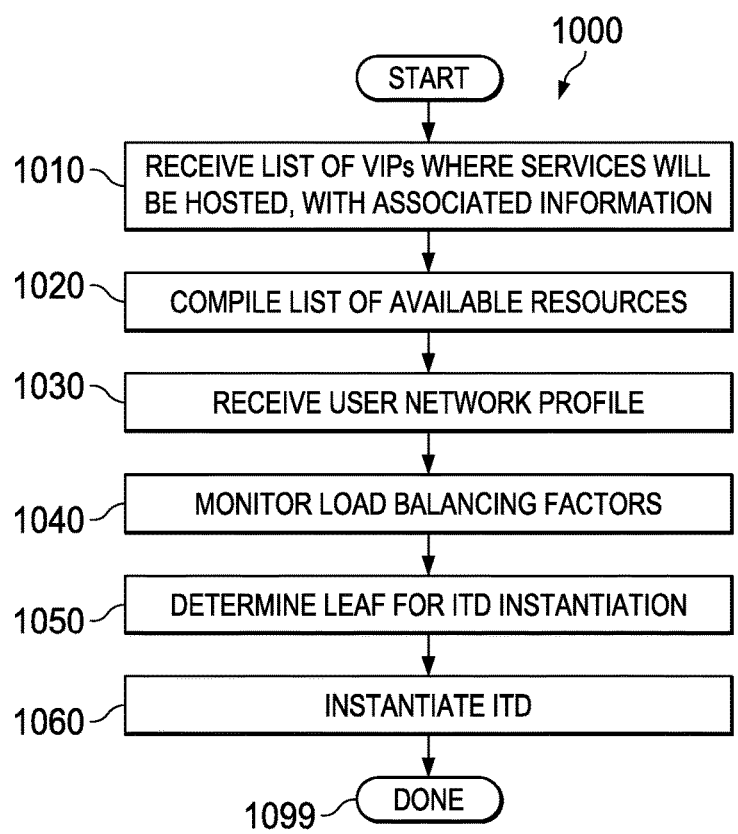
FIG. 10 is a block diagram of IP address masking according to one or more examples of the present Specification.

FIG. 10 is a flow chart of a method 1000 performed by network manager 870 according to one or more examples of the present Specification. In this embodiment, network manager 870 may be responsible for monitoring network conditions, and provisioning, de-provisioning, or re-provisioning ITD instances to meet network demands and to optimize network efficiency.

In block 1010, network manager 870 receives a list of VIPs where services will be hosted, along with other associated information for each VIP, such as the number of service nodes. These data may be stored internally in network manager 870, or they may be provided externally. In one embodiment, orchestrator 880 provides a user interface, such as a graphical user interface (GUI) or command-line interface (CLI) or similar for a user such as network administrator 150 to provide configuration data and options, including configuring subnetworks or workloads 842. Orchestrator 880 may then provide these data to network manager 870. In another embodiment, network manager 870 provides such an interface, and network administrator 150 enters it directly. In yet another embodiment, network manager 870 infers the data from an electronic survey of the network, existing routing tables, or other factors.

In block 1020, network manager 870 compiles a list of available resources, such as switches, line cards, and ports on the fabric.

In block 1030, network manager 870 receives from a user such as network administrator 150 a network profile, including necessary configuration options. This may include, for example, designation of certain subnetworks or VIPs as being part of the load balancing topology or not. This may include whether to associate an entire network or rather just a subset (range) of addresses with load balancing. In this operation, the user may also provide an ITD device group name for one or more ITD device groups.

If ITD has not been initially configured, then also in this operation, network manager 870 may perform initial ITD provisioning and configuration. After initial configuration, network manager 870 pushes the ITD profile and other configuration data to the ITD service nodes (e.g., leaf switches 390).

In block 1040, network manager 870 monitors network conditions and load balancing factors, including for example the factors listed in the discussion of network manager 870 above with reference to FIG. 8. Network manager 870 may watch particularly for changes in network conditions, such as the provisioning of new VIPs (which may indicate a new service that needs to be load balanced), or the inclusion of new service nodes in a workload 842, which may indicate that an existing load balancing configuration needs reconfiguration to account for the new node.

In Block 1050, network manager 870 may also analyze and determine whether a particular VIP is suitable for ITD. In some cases, a particular workload 842 may be more suitable for non-ITD load balancing, such as a traditional load balancer appliance or VM instance. Network manager 870 may also attempt to optimize ITD provisioning, for example, by selecting the appropriate leaf switch 890 to provision ITD on (for example, a border leaf may be more suitable). One way to analyze this factor is to see if most traffic coming to the ITD instance is from leaf interfaces, which may be a more efficient provisioning. If most traffic is coming from spine 892, then this may be a sub-optimal routing configuration, because traffic is not coming directly from clients to the ITD via the fabric. From the fabric to individual servers, if ITD is instantiated on the correct leaf using TID mobility, the packet has to traverse the fabric only once.

In some cases, network manager 870 may continuously or periodically monitor traffic patterns to determine if the ITD deployment pattern can be further optimized.

In block 1060, as necessary from the analysis performed in block 1050, network manager 870 may instantiate and configure additional ITD instances on particular switches 190, such as leaf switches 890. Note that this may also comprise de-provisioning some sub-optimal ITD instances.

In block 1099, the method is done.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, provisioned in service appliance 224 and/or switch 190 (e.g., through various modules, algorithms, processes, etc.). In some embodiments, one or more of these features may be implemented in hardware, provided external to these elements, or consolidated in any appropriate manner to achieve the intended functionality. Service appliance 224 and/or switch 190 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switch 190 and service appliance 224 described and shown herein (and/or their associated structures) may also include suitable interfaces for receiving, transmitting, and/or otherwise communicating data or information in a network environment. Additionally, some of the processors and memories associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memories (e.g., memory 392, memory 388) can store data used for the operations described herein. This includes the memory being able to store instructions (e.g., as part of logic, software, code, etc.) that are executed to carry out the activities described in this Specification. A processor can execute any type of instructions associated with the data to achieve the operations detailed herein in this Specification. In one example, processors 386 and processor 390 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in system 110 can include one or more memory elements (e.g., memory 388, memory 392) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 110 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, formatting, and protocols, system 110 may be applicable to other exchanges, formats, or routing protocols. Moreover, although system 110 has been illustrated with reference to particular elements and operations that facilitate the communication process, these elements, and operations may be replaced by any suitable architecture or process that achieves the intended functionality of system 110.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

By way of nonlimiting example, there is disclosed a network apparatus, comprising: one or more logic elements, including at least one hardware logic element, to provide a network manager engine to: provide a switched fabric management function; communicatively couple to at least one network switch, the network switch configured to provide optional native hardware-based load balancing; monitor one or more load balancing factors; and at least partly responsive to the one or more load balancing factors, configure native hardware-based load balancing on the at least one network switch.

There is further disclosed an example, wherein the switched fabric is a leaf-spine fabric.

There is further disclosed an example, wherein the at least one network switch is a leaf switch.

There is further disclosed an example, wherein the leaf switch is a border switch.

There is further disclosed an example, wherein the one or more load balancing factors comprise a number of available ports.

There is further disclosed an example, wherein the one or more load balancing factors comprise a number of services provisioned per load balancing network switch.

There is further disclosed an example, wherein the one or more load balancing factors comprises a number of service nodes provisioned per load balancing network switch.

There is further disclosed an example, wherein the one or more load balancing factors comprises detecting that a load balancing network switch has experienced a failure.

There is further disclosed an example, wherein the one or more load balancing factors comprise determining whether a network switch receives a majority of traffic from a spine switch.

There is further disclosed an example of one or more tangible, non-transitory computer-readable storage mediums having stored thereon executable instructions for providing a network manager as in any of the preceding examples.

There is further disclosed an example of a method of providing a network manager as in any of the preceding claims.

There is further disclosed an example of an apparatus comprising means for performing the method.

There is further disclosed an example wherein the apparatus comprise a processor and a memory.

There is further disclosed an example wherein the memory comprises a TCAM.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

What is claimed is:

1. A network apparatus, comprising:
   one or more logic elements, including at least one hardware logic element to:
   provide a management function for a switched fabric wherein the switched fabric is a leaf-spine fabric;
   communicatively couple to at least one network switch, the network switch comprising native hardware configured to provide optional native hardware-based load balancing, the network switch comprising a plurality of physical ports, and wherein the network switch is a leaf switch;
   monitor one or more load balancing factors;
   at least partly responsive to the one or more load balancing factors, configure native hardware-based load balancing by each physical port of the plurality of physical ports using the native hardware of the at least one network switch, wherein configuring native hardware-based load balancing comprises instantiating a load balancing instance on the native hardware of the leaf switch in response to determining that a majority of traffic arriving at the leaf-spine fabric is arriving at a leaf interface of the leaf switch, wherein configuring the native hardware-based load balancing comprises comparing a virtual internet protocol (VIP) address tag of traffic to one or more entries in a ternary content-addressable memory (TCAM) of the network switch, and applying load balancing to traffic whose VIP tag matches an entry in the TCAM; and
   de-provision the load balancing instance in response to determining that load balancing is no longer necessary at the network switch based at least partly on the one or more load balancing factors.

2. The network apparatus of claim 1, wherein the leaf switch is a border switch.

3. The network apparatus of claim 1, wherein the one or more load balancing factors comprise a number of available ports.

4. The network apparatus of claim 1, wherein the one or more load balancing factors comprise a number of services provisioned on the network switch.

5. The network apparatus of claim 1, wherein the one or more load balancing factors comprises a number of service nodes provisioned on the network switch.

6. The network apparatus of claim 1, wherein the one or more load balancing factors comprises detecting that the network switch has experienced a failure.

7. The network apparatus of claim 1, wherein the one or more load balancing factors comprise determining whether the network switch receives a majority of traffic from a spine switch.

8. The network apparatus of claim 1, wherein the load balancing instance performs bucketization of traffic by mapping a plurality of buckets to a plurality of service nodes, and wherein the load balancing instance redirects traffic that is assigned to a bucket to a corresponding service node.

9. The network apparatus of claim 8, wherein the load balancing instance assigns incoming traffic to a bucket of the plurality of buckets based on a source of the incoming traffic.

10. One or more tangible, non-transitory computer-readable storage mediums having stored thereon executable instructions to:
provide a management function for a switched fabric, wherein the switched fabric is a leaf-spine fabric;
communicatively couple to at least one network switch, the network switch comprising native hardware configured to provide optional native hardware-based load balancing, the network switch comprising a plurality of physical ports, and wherein the network switch is a leaf switch;
monitor one or more load balancing factors;
at least partly responsive to the one or more load balancing factors, configure native hardware-based load balancing by each physical port of the plurality of physical ports using the native hardware of the at least one network switch, wherein configuring native hardware-based load balancing comprises instantiating a load balancing instance on the native hardware of the leaf switch in response to determining that a majority of traffic arriving at the leaf-spine fabric is arriving at a leaf interface of the leaf switch, wherein configuring the native hardware-based load balancing comprises comparing a virtual internet protocol (VIP) address tag of traffic to one or more entries in a ternary content-addressable memory (TCAM) of the network switch, and applying load balancing to traffic whose VIP tag matches an entry in the TCAM; and
de-provision the load balancing instance in response to determining that load balancing is no longer necessary at the network switch based at least partly on the one or more load balancing factors.

11. The one or more tangible, non-transitory computer-readable mediums of claim 10, wherein the leaf switch is a border switch.

12. The one or more tangible, non-transitory computer-readable mediums of claim 10, wherein the one or more load balancing factors comprise a number of available ports.

13. The one or more tangible, non-transitory computer-readable mediums of claim 10, wherein the one or more load balancing factors comprise a number of services provisioned on the network switch.

14. The one or more tangible, non-transitory computer-readable mediums of claim 10, wherein the one or more load balancing factors comprises a number of service nodes provisioned on the network switch.

15. The one or more tangible, non-transitory computer-readable mediums of claim 10, wherein the one or more load balancing factors comprises detecting that the network switch has experienced a failure.

16. The one or more tangible, non-transitory computer-readable mediums of claim 10, wherein the one or more load balancing factors comprise determining whether the network switch receives a majority of traffic from a spine switch.

17. A computer-implemented method comprising:
providing a management function for a switched fabric, wherein the switched fabric is a leaf-spine fabric;
communicatively coupling to at least one network switch, the network switch comprising native hardware configured to provide optional native hardware-based load balancing, the network switch comprising a plurality of physical ports, and wherein the network switch is a leaf switch;
monitoring one or more load balancing factors;
at least partly responsive to the one or more load balancing factors, configuring native hardware-based load balancing by each physical port of the plurality of physical ports using the at least one network switch, wherein configuring native hardware-based load balancing comprises instantiating a load balancing instance on the native hardware of the leaf switch in response to determining that a majority of traffic arriving at the leaf-spine fabric is arriving at a leaf interface of the leaf switch, wherein configuring the native hardware-based load balancing comprises comparing a virtual internet protocol (VIP) address tag of traffic to one or more entries in a ternary content-addressable memory (TCAM) of the network switch, and applying load balancing to traffic whose VIP tag matches an entry in the TCAM; and
de-provisioning the load balancing instance in response to determining that load balancing is no longer necessary at the network switch based at least partly on the one or more load balancing factors.

* * * * *